United States Patent
Son et al.

(10) Patent No.: US 9,368,835 B2
(45) Date of Patent: Jun. 14, 2016

(54) ADDITIVES FOR NON-AQUEOUS ELECTROLYTE AND SECONDARY BATTERY USING THE SAME

(71) Applicant: LG Chem, Ltd., Seoul (KR)

(72) Inventors: Miyoung Son, Daejeon (KR); Jeong-Ju Cho, Daejeon (KR); Hochun Lee, Daejeon (KR); Joomi Jeon, Daejeon (KR); Sunghoon Yu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/279,705

(22) Filed: May 16, 2014

(65) Prior Publication Data
US 2014/0295221 A1 Oct. 2, 2014

Related U.S. Application Data

(63) Continuation of application No. 12/600,070, filed as application No. PCT/KR2008/002710 on May 15, 2008, now Pat. No. 8,785,015.

(30) Foreign Application Priority Data

May 15, 2007  (KR) ........................ 10-2007-0047127

(51) Int. Cl.

| | |
|---|---|
| *H01M 4/13* | (2010.01) |
| *H01M 4/58* | (2010.01) |
| *H01M 6/12* | (2006.01) |
| *H01M 6/46* | (2006.01) |
| *H01M 4/00* | (2006.01) |
| *H01M 4/50* | (2010.01) |
| *H01M 10/0567* | (2010.01) |
| *H01M 2/12* | (2006.01) |
| *H01M 10/052* | (2010.01) |
| *H01M 10/42* | (2006.01) |
| *H01M 10/48* | (2006.01) |
| *H01M 10/44* | (2006.01) |

(52) U.S. Cl.
CPC ............ *H01M 10/0567* (2013.01); *H01M 2/12* (2013.01); *H01M 10/052* (2013.01); *H01M 10/4235* (2013.01); *H01M 10/44* (2013.01); *H01M 10/48* (2013.01); *H01M 10/486* (2013.01); *Y02E 60/122* (2013.01); *Y02T 10/7011* (2013.01)

(58) Field of Classification Search
CPC ......... H01M 6/16; H01M 6/168; H01M 4/13; H01M 4/405; H01M 4/52
USPC ............ 429/327, 199, 326, 231.95, 162, 223, 429/224
See application file for complete search history.

(56) References Cited

U.S. PATENT DOCUMENTS

| | | | |
|---|---|---|---|
| 5,709,968 | A | 1/1998 | Shimizu |
| 5,763,119 | A | 6/1998 | Adachi |
| 6,074,777 | A | 6/2000 | Reimers et al. |
| 6,165,647 | A | 12/2000 | Watanabe et al. |
| 7,229,717 | B2 | 6/2007 | Yamaguchi et al. |

FOREIGN PATENT DOCUMENTS

| | | | | |
|---|---|---|---|---|
| JP | 2003308874 | A | 10/2003 | |
| JP | 2004-063114 | A | 2/2004 | |
| JP | 2005-044682 | A | 2/2005 | |
| JP | 2007-42329 | * | 2/2007 | ............ H01M 10/40 |
| KR | 20000039287 | A | 7/2000 | |
| KR | 20040021393 | A | 3/2004 | |
| KR | 20060051075 | A | 5/2006 | |

OTHER PUBLICATIONS

International Search Report, PCT/KR2008/002710, dated Aug. 22, 2008.
Office Action from corresponding Korean Patent Application No. 10-2007-0047127 issued Aug. 27, 2010.
Written Opinion for Application No. PCT/KR2008/002710 dated Aug. 22, 2008.

* cited by examiner

*Primary Examiner* — Patrick Ryan
*Assistant Examiner* — Julian Anthony
(74) *Attorney, Agent, or Firm* — Lerner, David, Littenberg, Krumholz & Mentlik, LLP

(57) ABSTRACT

Disclosed are an electrolyte for a secondary battery, and a secondary battery including the same, the electrolyte including an electrolyte salt; an electrolyte solvent; and a compound generating heat through oxidation at voltages higher than drive voltage of a cathode, wherein the compound can decompose or evaporate electrolyte components by oxidation heat, thereby causing gas generation. Also, the compound is included in an internal pressure increase accelerant for a battery. Upon overcharge, since a compound subjected to oxidation at voltages higher than normal drive voltage of a cathode generates heat, electrolyte components can be decomposed or evaporated, thereby generating gas by the oxidation heat. Accordingly, it is possible to operate a safety means of a battery, without using an internal pressure increasing material directly generating gas through oxidation at overcharge voltage as the electrolyte additive, and thus to improve the overcharge safety of a secondary battery.

8 Claims, 2 Drawing Sheets

US 9,368,835 B2

ADDITIVES FOR NON-AQUEOUS ELECTROLYTE AND SECONDARY BATTERY USING THE SAME

CROSS REFERENCE TO RELATED APPLICATIONS

The present application is a continuation of U.S. patent application Ser. No. 12/600,070, filed Aug. 11, 2010, which application is a national phase entry under 35 U.S.C. §371 of International Application No. PCT/KR2008/002710, filed May 15, 2008, published in English, which claims the benefit of Korean Patent Application No. 10-2007-0047127, filed May 15, 2007. The disclosures of said applications are incorporated by reference herein.

TECHNICAL FIELD

The present invention relates to a non-aqueous electrolyte and a secondary battery using the same, and more particularly to a non-aqueous electrolyte including a compound capable of improving overcharge safety of a battery without degrading performance of the battery, and a secondary battery using the same.

BACKGROUND ART

Recently, there has been increasing interest in energy storage technology. Electrochemical devices have been widely used as energy sources in portable phones, camcorders, notebook computers, PCs and electric cars, resulting in intensive research and development. In this regard, electrochemical devices are subjects of great interest. Particularly, development of rechargeable secondary batteries has been the focus of attention. Recently, research and development into an electrode and a battery having a novel design have been conducted in order to improve capacity density and specific energy thereof.

Among the currently used secondary batteries, lithium secondary batteries, developed in early 1990's, have drive voltage and energy density higher than those of conventional batteries using aqueous electrolytes (such as Ni-MH batteries, Ni—Cd batteries and $H_2SO_4$—Pb batteries), and thus they are spotlighted in the field of secondary batteries.

The secondary batteries may include a cathode, an anode, a porous separator and a non-aqueous electrolyte. In general, secondary batteries including an anode using a carbonaceous material, and a cathode using a lithium metal oxide have an average discharge voltage of about 3.6 to 3.7V, and a charge/discharge voltage ranging from 0 to 4.2V. However, in the lithium secondary batteries, a safety problem such as fire, explosion, etc. may occur due to the use of a non-aqueous electrolyte, and such a problem may be more significant by increasing the capacity density of the battery.

Especially, continuous charge or overcharge of a non-aqueous electrolyte secondary battery may significantly reduce the safety of the battery, and herein, one of the reasons that may cause such a problem is heat generation by the structural breakdown of a cathode. The operation principle is as follows. A cathode active material, such as a lithium-containing metal oxide capable of absorbing and releasing lithium and/or lithium ions, is deformed into a thermally unstable structure by the release of a large amount of lithium upon overcharge. In a state where the battery has been overcharged, when the battery temperature reaches the critical temperature by external physical impacts, such as high temperature exposure, etc., the structural unstable cathode active material releases oxygen, and an electrolyte solvent causes an exothermic decomposition reaction. The combustion of the electrolyte solution by such an exothermic reaction may be accelerated by oxygen released from the cathode and carried out in a chain-like manner, resulting in the fire and explosion phenomena of the battery, which are cause by thermal runaway. Accordingly, research on the control of such fire or explosion of a battery has been required, and various methods for solving the problems have been provided.

A first method is a method of using a compound subjected to a redox shuttle reaction, such as chloroanisole, as an electrolyte additive for consuming overcharge current. However, this method is disadvantageous in that the effect is not significant at high charge current.

A second method is a method of mechanically blocking current by controlling gas generation upon overcharge. As a representative example, there is introduction of a safety means, such as CID (Current Interrupt Device)-reverse, to a battery. Particularly, when the internal pressure of the battery is increased by gas generation within a cell upon overcharge, the CID-reverse blocks the current flowing through the cell and an additional current flow before fire and rupture occur by thermal runaway. Herein, before the fire and rupture occur by thermal runaway, CID short circuit is required to operate by increase of the internal pressure of the battery.

Accordingly, a material capable of directly increasing the internal pressure of a battery, such as cyclohexylbenzen (which is a compound capable of generating gas through a chemical reaction at overcharge voltage), has been usually added to an electrolyte. However, the use of an alkyl benzene derivative such as cyclohexylbenzen (CHB) may cause a problem in that battery performance is degraded after cycle repetition or continuous charge. Also, such an electrolyte additive is required to be a compound capable of generating a large amount of gas through oxidation at a required overcharge voltage, but an appropriate compound for such a purpose is very restrictive.

DISCLOSURE

Technical Problem

The inventors of the present invention have found that when a compound generating heat through oxidation at voltages higher than normal drive voltage of a cathode is used as an electrolyte additive, the oxidation heat of the compound decomposes or evaporates electrolyte components, and thus causes gas generation. Also, the inventors found that in such a case, it is possible to operate a safety means of a battery, without using an internal pressure increasing material directly generating gas through oxidation at overcharge voltage as the electrolyte additive, and thus to improve the safety of a secondary battery upon overcharge.

The present invention is based on the founding.

Technical Solution

In accordance with an aspect of the present invention, there is provided an electrolyte for a secondary battery, the electrolyte including (a) an electrolyte salt; (b) an electrolyte solvent; and (c) a compound generating heat through oxidation at voltages higher than the drive voltage of a cathode, wherein the compound can decompose or evaporate electrolyte components by oxidation heat, thereby causing gas generation.

Also, the present invention provides an internal pressure increase accelerant for a battery, the accelerant including a compound subjected to oxidation at voltages higher than the drive voltage of a cathode, wherein an amount of heat generated at the oxidation is within a range where electrolyte components can be decomposed or evaporated, and thereby generating gas.

MODE FOR INVENTION

Figure 1:
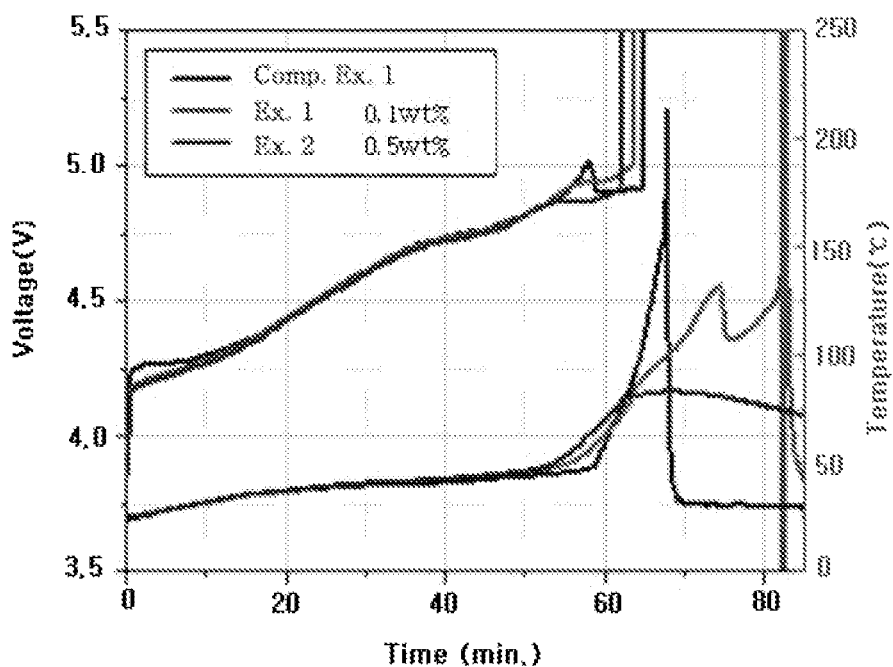
FIG. 1 is a graph illustrating the surface temperature and voltage of a battery upon overcharge according to Example 1.

In the present invention, a compound generating heat through oxidation at voltages higher than the drive voltage of a cathode is characteristically used as an electrolyte additive, thereby improving overcharge safety of a battery.

More specifically, in the present invention, upon overcharge, oxidation heat of the compound may decompose or evaporate electrolyte components, and thus cause gas generation. Accordingly, a safety means of the battery can be operated. Hereinafter, the present invention will be described in detail.

In general, as a means for securing overcharge safety of a secondary battery, a safety means is employed for the secondary battery, which is for blocking or discharging current flowing through a cell when the internal pressure of the battery is increased. Herein, in order to operate the safety means at required overcharge timing, an internal pressure is required to be sufficiently increased.

Meanwhile, the internal temperature of the battery usually increases according to charge/discharge. Herein, when the temperature is increased, conventional electrolyte components of the battery, especially an electrolyte solvent, may be decomposed or evaporated at a temperature higher than a certain value, thereby generating gas. Such gas generation may increase the internal pressure of the battery, and thus a safety means such as CID may operate. However, in general, since such an increase of the internal temperature of the battery is a spontaneous phenomenon, it is difficult to artificially control the increase. In other words, when an increased degree of the internal temperature of the battery is insignificant, an amount of generated gas is not enough to operate the safety means at required overcharge timing. Accordingly, there is a possibility that the battery will be exploded and/or be ruptured by other causes.

Accordingly, as a method of directly increasing the internal pressure of a battery upon overcharge, a method of using a compound directly generating gas through oxidation at voltages higher than drive voltage of a cathode (hereinafter, referred to as a 'direct internal pressure increasing material') as an electrolyte additive has been conventionally employed. However, when such a direct internal pressure increasing material cannot generate a sufficient amount of gas during oxidation, a safety means does not operate at appropriate timing as mentioned above. Accordingly, there is a possibility that fire and/or rupture of the battery will occur. Also, when operation voltage of the safety means is lowered in order to solve such a problem, the safety means may operate by a slightly increased internal pressure during normal operation of the battery, and thus the battery cannot be used anymore. Therefore, the direct internal pressure increasing material is required to be a compound that can momentarily generate a large amount of gas through oxidation at required overcharge voltage, and thus can sufficiently increase the internal pressure of the battery. However, a compound appropriate for the requirement is very restrictive.

Therefore, the present invention employs, as an electrolyte additive, a compound that is subjected to oxidation at voltages higher than drive voltage of a cathode, and generates heat by the oxidation in an amount within a range where electrolyte components can be decomposed or evaporated (hereinafter, referred to as an 'electrolyte additive of the present invention'), instead of the above mentioned direct internal pressure increasing material.

The electrolyte additive of the present invention has an oxidation potential higher than the drive voltage of a cathode, and thus may be oxidized at overcharge voltage of a secondary battery. The heat generated by the oxidation increases the internal temperature of the battery, and causes gas generation through decomposition or evaporation of the above mentioned electrolyte components, especially an electrolyte solvent, thereby increasing the internal pressure of the battery. As a result, in the present invention, the temperature and/or internal pressure of the battery may be increased at required overcharge timing, thereby allowing a safety means of the battery to operate. Therefore, it is possible to prevent fire and rupture of the battery.

For example, in the case of a secondary battery using a carbonate solvent and the electrolyte additive of the present invention as electrolyte components, the electrolyte additive of the present invention is oxidized at overcharge voltage (ex. 4.7V), and gas such as $CO_2$, $CH_4$, etc. may be generated through decomposition and evaporation of the carbonate solvent by the oxidation heat. Accordingly, upon overcharge, the pressure within the battery is increased, and thus a safety means such as CID, vent, etc. operates, thereby securing the safety of the battery.

The electrolyte additive of the present invention is a compound having an oxidation initiation potential higher than the drive voltage of a cathode used for a battery. There is no particular limitation in the electrolyte additive, as long as the electrolyte additive is a compound generating heat in an amount equal to or more than the range where conventional electrolyte components for the battery can be decomposed or evaporated (phase transfer). Also, the amount of generated heat is preferably in an amount less than the range where a cathode active material can be structurally broken down because when the structure of the cathode active material is broken down by an excessive increase of internal temperature of the battery by oxidation heat of the compound, oxygen released from the cathode active material may cause fire or explosion of the battery.

The required amount of generated heat may be calculated by heat capacity within the battery, thermal gradient within the battery, an inflow/outflow amount of heat within the battery, and the internal temperature of the battery at overcharge timing when a safety means is required to operate. For example, when the thermal gradient within the battery does not exist or is negligible, the amount of generated heat may be calculated by the following Formula 1.

$$Q = C_M \cdot T \qquad \text{[Formula 1]}$$

In Formula 1, $C_M$ indicates heat capacity within a battery; and T indicates the internal temperature of the battery at overcharge timing when a safety means is required to operate, which is preferably within a range of from decomposition/evaporation temperature of electrolyte components to fire temperature of a cathode active material.

The electrolyte additive of the present invention is preferably a compound subjected to a reversible redox shuttle reaction. The compound subjected to the reversible redox shuttle reaction can consume current by trapping electrons at oxidation and reduction, and usually generates heat at the oxidation and reduction reaction. Accordingly, the oxidation-reduction shuttle compound can more efficiently consume overcharge current by moving between a cathode and an anode in an overcharge voltage range of the present invention, and also can more rapidly generate a large amount of heat by the redox shuttle reaction, thereby increasing the temperature increasing rate and/or the gas generating rate within the battery. In other words, when the electrolyte additive of the present invention is an oxidation-reduction shuttle compound, it is possible to achieve a sufficient increasing effect of temperature and/or pressure by a small amount of the electrolyte additive, and also upon overcharge, the temperature/pressure can easily reach the range of operation temperature/pressure of a safety means. A representative example of the oxidation-reduction shuttle compound may include a compound having a benzene ring as a backbone.

Meanwhile, the amount of gas generated by the electrolyte additive of the present invention is not limited as long as the amount is within a range where the safety means of sensing pressure change within the battery can operate. Herein, the gas is mainly generated by decomposition or evaporation of electrolyte components by oxidation heat of the electrolyte additive of the present invention, and also may be generated by phase transfer or oxidation of the electrolyte additive of the present invention, which is caused by a rise in temperature.

The electrolyte additive of the present invention is not particularly limited, but is preferably one of 1,4-dimethoxytetrafluorobenzene, and 5,6,7,8-tetrafluorobenzo-1,4-dioxane in consideration of the oxidation potential, oxidation heat, heat generation rate at oxidation, etc. of a compound. The compounds may be used alone or in combination.

The amount of the above mentioned electrolyte additive can be adjusted in consideration performance and stability of the battery, and for example, may be calculated by the following Formula 2. If the compound is used in an excessive amount, the viscosity of the electrolyte may be increased, thereby reducing transferability of lithium ions. Therefore, the electrolyte additive is preferably used in an amount of 0.05 to 5 parts by weight, based on 100 parts by weight of a conventional battery electrolyte.

$$M = \frac{Q}{C}$$ [Formula 2]

In Formula 2, M indicates the used amount of an electrolyte additive; Q indicates quantity of heat required for decomposition or evaporation of electrolyte components at overcharge timing when a safety means is required to operate; and C indicates oxidation heat per gram of a used compound.

An electrolyte for a secondary battery, in which the electrolyte additive of the present invention is used, includes conventional electrolyte components known in the art, such as an electrolyte salt, an electrolyte solvent, etc.

Examples of an electrolyte salt, which can be used in the present invention, include salts having a structure such as $A^+B^-$, wherein $A^+$ includes an ion selected from among alkaline metal cations, such as $Li^+$, $Na^+$ and $K^+$, and combinations thereof, and $B^-$ includes an ion selected from among anions, such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, and combinations thereof. Particularly, a lithium salt is preferred.

As the electrolyte solvent, a conventional organic solvent known in the art, such as a cyclic carbonate and/or a linear carbonate, may be used. Non-examples of the electrolyte solvent include propylene carbonate (PC), ethylene carbonate (EC), vinylene carbonate (VC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, propionic acid methyl, propionic acid ethyl, propionic acid butyl, and a halogen derivative thereof. Each of the above solvents may be used alone or in combination.

Also, the present invention provides a secondary battery including (a) a cathode; (b) an anode; and (c) an electrolyte additive of the present invention, preferably which may further include (d) a separator.

As the secondary battery, a lithium secondary battery, such as a lithium metal secondary battery, a lithium ion secondary battery, a lithium polymer secondary battery, or a lithium ion polymer secondary battery, is preferred.

The secondary battery according to the present invention may be obtained according to a conventional method known in the art. For example, the battery may be obtained by interposing a separator between an anode and a cathode and injecting the electrolyte prepared of the present invention thereto.

An electrode to be applied to the secondary battery of the present invention is not particularly limited and may be prepared as a structure where a cathode active material or an anode active material is adhered to a current collector by a conventional method well known in the art. As the cathode active material that may be used in the present invention, a conventional cathode active material used for a cathode of a conventional secondary battery may be used. Non-limiting examples of the cathode active material may include a lithium transition metal composite oxide such as $LiM_xO_y$ (M=Co, Ni, Mn, $Co_aNi_bMn_c$) (for example, lithium manganese composite oxide such as $LiMn_2O_4$, lithium nickel oxide such as $LiNiO_2$, lithium cobalt oxide such as $LiCoO_2$, oxides in which the manganese, nickel, and cobalt are substituted by transition metal, lithium containing vanadium oxide, etc), chalcogenide (for example, manganese dioxide, titanium disulfide, molybdenum disulfide, etc.), etc. Preferably, the cathode active material may be selected from the group including $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (herein, $0 \leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (herein, $0<Z<2$), $LiCoPO_4$, $LiFePO_4$, a mixture thereof, etc. Non-limiting examples of the cathode current collector may include a foil made of aluminum, nickel, or a combination thereof.

As an anode active material that may be used in the present invention, a conventional anode active material used for an anode of a conventional secondary battery may be used. Non-limiting examples of the anode active material may include lithium-absorbing materials, such as lithium metal, lithium alloy, carbon, petroleum coke, activated carbon, graphite, graphitized carbon, other carbons, etc. Non-limiting examples of the anode current collector may include a foil made of copper, gold, nickel, copper alloy or a combination thereof.

A separator which can be used in the present invention is not limited to any specific separator, but a porous separator may be used, and examples thereof include porous polypropylene, polyethylene or polyolefin separators.

There is no particular limitation in the outer shape of the secondary battery according to the present invention. The secondary battery may be a cylindrical battery using a can, a coin-type battery, a prismatic battery, or a pouch-type battery.

Also, the secondary battery may include a high-voltage battery with a charge voltage of up to 4.35V, as well as a conventional battery, the charge/discharge region of which ranges from 0V to 4.2V. Also, the electrolyte additive of the present invention does not have an effect on battery performance within a normal drive voltage range of the battery, and thus can be usefully applied to a high-voltage battery with a voltage of 4.35V or more (see FIG. 3).

Also, the secondary battery preferably includes at least one safety means selected from the group including (a) a first safety means for discontinuing battery charge or converting a charge state into a discharge state; and (b) a second safety means for emitting heat or gas within the battery to the outside, after sensing a change in pressure and/or temperature within the battery.

Non-limiting examples of the first safety means that may be used in the present invention include a conventional pressure sensing device such as CID, a conventional temperature sensing device such as PTC, etc., which may be used alone or in combination. The pressure/temperature sensing device may be integrated into one body, or otherwise may include (i) a pressure/temperature sensing member; (ii) a conducting wire for transferring current transferred from the pressure/temperature sensing member; and (iii) a member for discontinuing the charge of a device or converting a charge state into a discharge state, in response to the current transferred through the conducting wire.

Herein, the pressure/temperature sensing device refers to a device which discontinues charge of an electrochemical device or discharges the device by sensing a change in pressure/temperature (increase of pressure/temperature) within a hermetic device, and then blocking or discharging current, or emitting the current toward outside or a control circuit. There is no particular limitation in the kind and form of sensing device as long as it can carry out the above mentioned operations within a certain pressure/temperature range.

There is no particular limitation in the pressure/temperature range where the pressure/temperature sensing device can operate, as long as the range is out of conventional internal pressure/temperature of the battery, and is within a range where rupture does not occur. Preferably, the pressure range is within 9 to 13 kg/cm$^2$, and the temperature range is within a range of 60 to 80° C.

Examples of the pressure sensing device may include a crystal with piezoelectricity, which can generate current by sensing a change in pressure. Also, examples of the temperature sensing device may include a ceramic material of which resistance varies according to temperature.

Also, there is no particular limitation in the second safety means, as long as it functions as emitting heat or gas (for example, combustible gas) within the device by sensing a change in pressure and/or temperature within the device. Non-limiting examples of the second safety means include a pressure relief valve such as a vent.

In the secondary battery including the safety means, the first safety means and/or the second safety means may be operated by temperature increase within the battery by oxidation heat generated from the electrolyte additive of the present invention, and/or by volume expansion and internal pressure increase of the battery by gas blow-off pressure of electrolyte components. Accordingly, it is possible to preemptively prevent fire and/or rupture of the battery.

Furthermore, the present invention provides an internal pressure increase accelerant for a battery. The internal pressure increase accelerant includes a compound that is subjected to oxidation at voltages higher than drive voltage of a cathode, and generates heat by the oxidation in an amount within a range where electrolyte components can be decomposed or evaporated, thereby generating gas. Preferably, examples of the compound include 1,4-dimethoxytetrafluorobenzene), 5,6,7,8-tetrafluorobenzo-1,4-dioxane, etc. which may be used alone or in combination.

Reference will now be made in detail to the preferred embodiments of the present invention. However, the following examples are illustrative only, and the scope of the present invention is not limited thereto.

Example 1

An electrolyte was prepared by adding 5,6,7,8-tetrafluorobenzo-1,4-dioxane to a 1M LiPF$_6$ solution including 94 wt % of a mixed solvent of FEC, PC, and DMC (FEC:PC:DMC=2:1:7 in a volume ratio), 3 wt % of PRS, 1 wt % of SN, and 2 wt % of PS, in an amount of 0.1 parts by weight based on 100 parts by weight of the electrolyte.

The prepared electrolyte, LiCoO$_2$ as a cathode, MAG-E as an anode, and aluminum laminate package were used to fabricate a cylindrical secondary battery mounted with CID according to a conventional method.

Example 2

An electrolyte and a secondary battery including the electrolyte were obtained in the same manner as described in Example 1, except that 5,6,7,8-tetrafluorobenzo-1,4-dioxane was used in an amount of 0.5 parts by weight instead of 0.1 parts by weight.

Example 3

An electrolyte and a secondary battery including the electrolyte were obtained in the same manner as described in Example 1, except that 5,6,7,8-tetrafluorobenzo-1,4-dioxane was used in an amount of 3 parts by weight instead of 0.1 parts by weight.

Comparative Example 1

An electrolyte and a secondary battery including the electrolyte were obtained in the same manner as described in Example 1, except that 5,6,7,8-tetrafluorobenzo-1,4-dioxane was not added to the electrolyte.

Experimental Example 1

While each of the secondary batteries obtained from Examples 1 and 2 and Comparative Example 1 was overcharged at 10V and 1C, surface temperature of the battery, CID short, and fire/explosion of the battery were observed. FIG. 1 shows the results.

As shown in FIG. 1, in each of the secondary batteries obtained from Examples 1 and 2 and Comparative Example 1, voltage rapidly increased after 60 minutes, in the order of Example 2→Example 1→Comparative Example 1. Herein, it is assumed that such a rapid increase of voltage is caused by the operation of CID mounted to the battery. Accordingly, it is determined that batteries according to the present invention obtained from Examples 1 and 2 can operate CID earlier than the battery obtained from Comparative Example 1.

Also, the battery of Comparative Example 1 showed a CID operation temperature of about 125° C. The temperature is largely out of a normal operation range of the battery. Accordingly, it is determined that in the battery of Comparative Example 1, fire or explosion of the battery may occur before CID operation. On the other hand, the batteries of Examples 1 and 2 showed about 70 to 80° C. during CID operation. Accordingly, it is determined that in the battery of Example 2, since a sufficient amount of gas is generated by oxidation heat of 5,6,7,8-tetrafluorobenzo-1,4-dioxane, CID can operate before fire or explosion of the battery, thereby securing the safety of the battery.

For reference, in the battery of Example 2 in which 5,6,7,8-tetrafluorobenzo-1,4-dioxane was used in a larger amount, it is determined that more excellent safety can be achieved because internal temperature is gently increased according to time, and the degree of increased temperature is not significant.

Experimental Example 2

Figure 2:
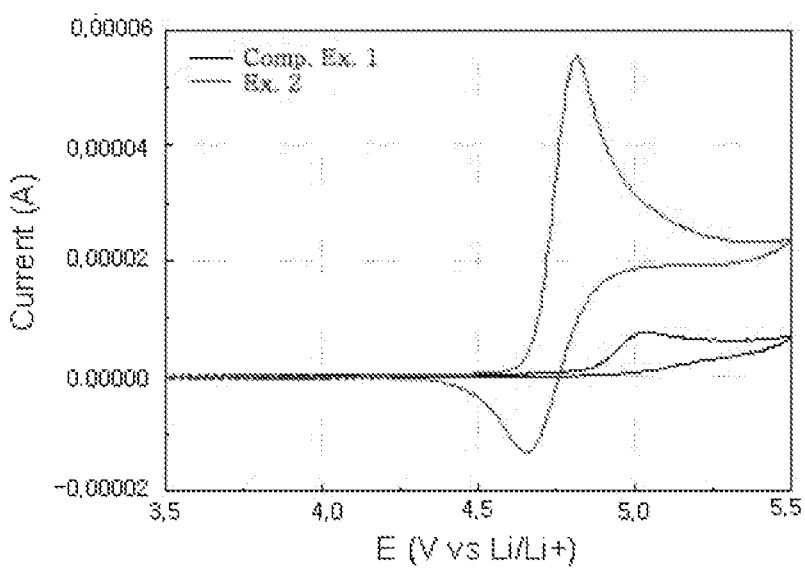
FIG. 2 is a cyclic voltammetry graph according to Example 2.

Cyclic voltammetry was carried by using Pt electrode as a working electrode, Li metal as a reference electrode, and each of electrolytes obtained from Example 2 and Comparative Example 1. FIG. 2 shows the results. Herein, a voltage scan rate was 20 mV/s.

As shown in FIG. 2, the electrolyte of Comparative Example 1 has an oxidation potential of about 5.0V, and the electrolyte additive of the present invention (5,6,7,8-tetrafluorobenzo-1,4-dioxane) has an oxidation potential of about 4.7V. Accordingly, it is expected that the electrolyte additive of the present invention can be oxidized at a lower potential than a combined electrolyte, thereby improving the safety of a battery.

Experimental Example 3

Each of the batteries obtained from Example 2 and Comparative Example 1 was charged/discharged at 23° C. 100 times. The maintenance rate (%) of discharge capacity according to a charge/discharge cycle was plotted in FIG. 3. Herein, the charge was carried out at 0.8C (constant current) and 4.35V (constant voltage), and the discharge was carried out at 0.5C (constant current) and cut-off voltage of 3.0V.

Figure 3:
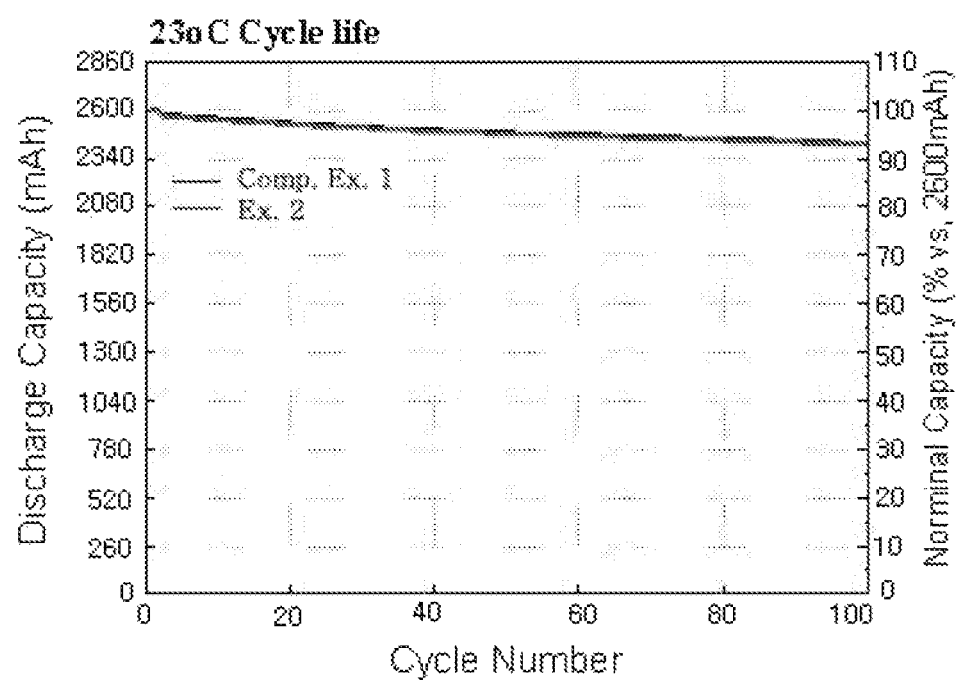
FIG. 3 is a graph illustrating cycle life characteristics of a battery according to Example 3.

As shown in FIG. 3, it is determined that the electrolyte additive of the present invention (5,6,7,8-tetrafluorobenzo-1,4-dioxane) does not cause performance degradation of a battery within a normal operation range (23° C.) of the battery, even when used for a high-voltage battery with a charge voltage of up to 4.35V.

Based on the results of Experimental Examples 1, 2, and 3, it can be understood that the electrolyte additive of the present invention does not have an effect the performance of a battery at all during a normal operation of the battery, but can operate a safety means of a battery early by generating heat through oxidation and causing generation in a large amount of gas upon overcharge of the battery.

INDUSTRIAL APPLICABILITY

In the present invention, upon overcharge, since a compound subjected to oxidation at voltages higher than normal drive voltage of a cathode generates heat, electrolyte components can be decomposed or evaporated, thereby generating gas by the oxidation heat. Accordingly, it is possible to operate a safety means of a battery, without using an internal pressure increasing material directly generating gas through oxidation at overcharge voltage as the electrolyte additive, and thus to improve the overcharge safety of a secondary battery.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising: a cathode, an anode, an electrolyte and a pressure sensing device or a temperature sensing device,
   wherein the electrolyte comprises (a) an electrolyte salt; (b) an electrolyte solvent comprising a combination of fluoroethylene carbonate, propylene carbonate and dimethyl carbonate; and (c) a compound generating heat through oxidation at voltages higher than drive voltage of a cathode,
   wherein the compound (c) is 1,4-dimethoxytetrafluorobenzene,
   wherein the compound decomposes or evaporates electrolyte components by oxidation heat, thereby causing generation of gas, and
   wherein a content of the compound (c) is within a range of 0.05 to 5 parts by weight, based on 100 parts by weight of the electrolyte.

2. The lithium secondary battery of claim 1, wherein an amount of the heat generated by the oxidation of the compound (c) is equal to or more than a range where the electrolyte components are decomposed or evaporated, and is less than a range where structural breakdown of a cathode active material is caused.

3. The lithium secondary battery of claim 1, wherein the compound (c) is a compound subjected to a reversible redox shuttle reaction.

4. The lithium secondary battery of claim 3, wherein the compound subjected to the reversible redox shuttle reaction generates heat at both oxidation and reduction.

5. The lithium secondary battery of claim 1, wherein an amount of the gas generated by the compound (c) is within a range where a safety means sensing pressure change within the battery can operate.

6. The lithium secondary battery of claim 1, wherein charge voltage is up to 4.35V.

7. The lithium secondary battery of claim 1, wherein a content of the compound (c) is within a range of 0.05 to 3 parts by weight, based on 100 parts by weight of the electrolyte.

8. The lithium secondary battery of claim 1, wherein a volume ratio of the fluoroethylene carbonate, the propylene carbonate and the dimethyl carbonate is 2:1:7.

* * * * *